United States Patent [19]

Pajunen

[11] Patent Number: 4,931,115
[45] Date of Patent: Jun. 5, 1990

[54] PLASTIC CLOTHING AND METHOD OF FABRICATION

[76] Inventor: Anne C. Pajunen, 5866 Eilat Dr., Woodland Hills, Calif. 91367

[21] Appl. No.: 38,935

[22] Filed: Apr. 16, 1987

[51] Int. Cl.⁵ .................. B32B 31/18; B32B 31/20; B32B 31/22
[52] U.S. Cl. .................. 156/73.1; 156/156; 156/228; 156/245; 156/252; 156/253; 156/285; 156/292; 156/308.4
[58] Field of Search ............ 156/73.1, 251, 252, 156/253, 156, 245, 251, 285, 308.4; 2/49 A, 49 R, 159, 51

[56] References Cited

U.S. PATENT DOCUMENTS

| | | | |
|---|---|---|---|
| 3,625,790 | 12/1971 | Ayres | 2/159 |
| 3,719,736 | 3/1973 | Woodruff | 156/252 |
| 4,141,771 | 2/1979 | Barker | 156/245 |
| 4,476,588 | 10/1984 | Long | 2/159 |
| 4,643,791 | 2/1987 | Jurrius | 156/252 |
| 4,646,364 | 3/1987 | O'Larey | 2/49 R |

Primary Examiner—George F. Lesmes
Assistant Examiner—J. Davis
Attorney, Agent, or Firm—Gilbert Kivenson

[57] ABSTRACT

A low cost process for molding of plastic clothing is described. The clothing can be stored on rolls or in flat packs prior to use. It can be removed by tearing an individual garment along the perforations provided.

2 Claims, 2 Drawing Sheets

PLASTIC CLOTHING AND METHOD OF FABRICATION

BACKGROUND AND OBJECTIVES OF THE INVENTION

This invention relates to improved disposable garments and a method for their fabrication. Limited wear plastic and other clothing is used in industries where it is desired to protect street clothes, to shield the skin from contact with toxic materials or to prevent harmful substances from being accidentally removed from work areas and transferred to the outside by adherence to street clothes. In these uses the clothing is removed and discarded or laundered at the end of each work period. The fabrication methods taught by the invention may also be applied to clothing which is used for street wear but can be mass produced for economic reasons. These applications include certain sports and children's wear.

In the prior art garments have been prepared from plastic sheets which are then stored on rolls. An individual item of clothing can be separated from the roll by means of perforations provided for this purpose. The garment is generally open at the back so that it can be draped around the body and tied with strings or plastic strips which are attached by heat sealing or adhesives. The draping compensates somewhat for what is generally a poor fit but leaves a portion of the body or street clothing exposed. In some items of disposable clothing—e.g. plastic shoe covers or gloves, the garment completely encloses the area to be protected but the fit is very poor and makes for clumsy movement. A construction which has been used to achieve some degree of fit and more complete body coverage is the poncho type of garment. In this case a head slit is cut into the center of a rectangular sheet of plastic. This sheet is almost twice as long as the wearer's height. The garment is then drawn in around the belt line by a cord. Much of the arm area however remains unprotected.

Prior art is represented by the following patents: U.S. Pat. No. 3,665,518 by Leadford, U.S. Pat. No. 3,727,236 by Lloyd and Sirak, U.S. Pat. No. 3,851,760 by Smith, U.S. Pat. No. 4,030,139 by Sonntag and U.S. Pat. No. 4,543,668 by Franklin.

There are available at present a number of reasonably priced plastic materials which can be laundered and reused. Disposability after one use need therefore not be an unavoidable consequence of the use of plastic materials for rapidly-produced garments.

It is one objective of the present invention to provide mass-produced garments in a range of sizes while reducing manufacturing costs and providing flexibility and variety in the clothing produced.

It is a second objective of the present invention to provide garments which can be conveniently dispensed from a roll or from a flat, accordion-packed pile.

It is a third objective of the present invention to provide garments which cover street wear completely so as to give better protection than those now in use and to provide garments which can themselves serve as low cost street wear.

These and other objectives will become apparent from the following specifications and drawings.

DESCRIPTION OF THE DRAWINGS

FIG. 1 shows the two principle components, a mold and a perforating press in open position and represents the start or end of one fabricating step. A garment has been molded and is ready for perforation; a second garment has been perforated and is ready to leave for storage on a roll.

DESCRIPTION THE INVENTION

Figure 1:
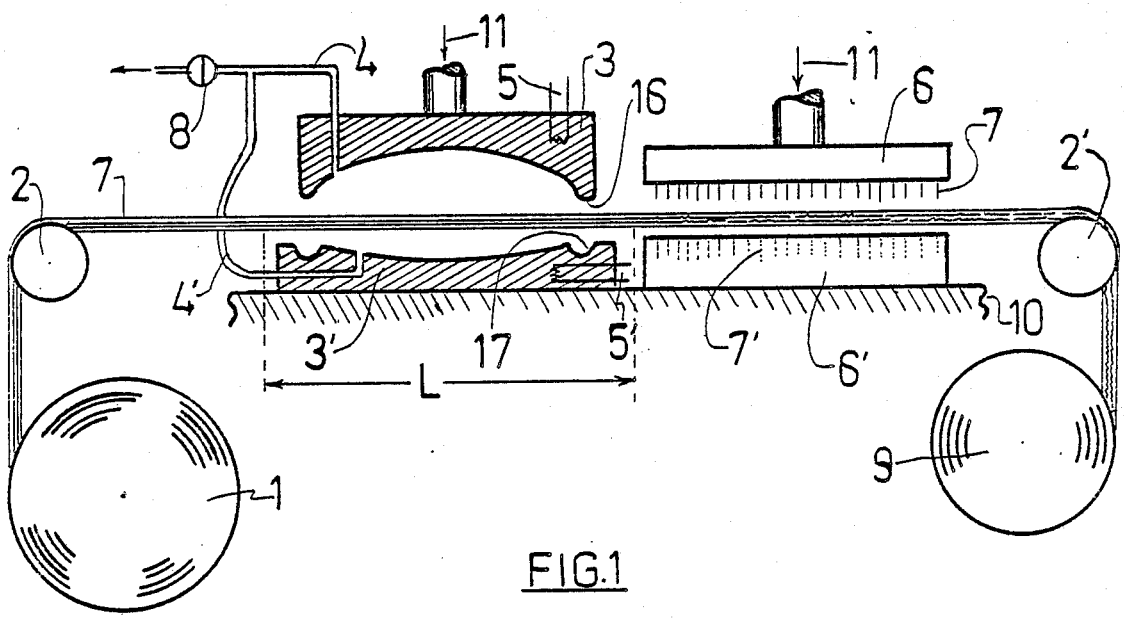
FIG. 1 illustrates the general layout of a process to manufacture garments according to the present invention.
Figure 2:
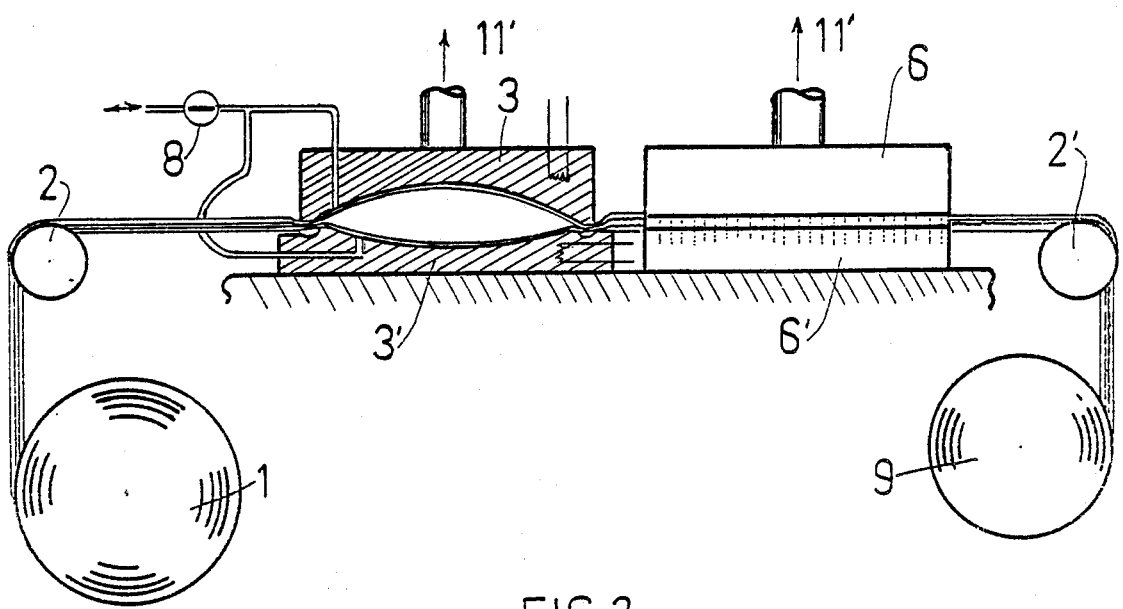
FIG. 2 is similar to FIG. 1 but with the mold parts and perforating press closed in the fabricating and perforation process.

The invention will be explained with reference to FIGS. 1, 2 and 3. In FIG. 1 a feed roll 1 contains a supply of flat, thermoplastic tubing 7 which is fed through the forming mold halves 3 and 3' and the perforating press parts 6 and 6' to the take-up roll 9. The upper half of the mold 3 and the upper part of the perforating press 6 are moveable in the direction 11 while the corresponding lower half of the mold 3' and the lower part of the press 6' are firmly fixed to a base 10. The mold halves 3 and 3" are shaped on their inside surfaces according to the garment to be produced—e.g. shirts, trousers, gloves, boots, etc. Each half of the mold is heated by an electrical or steam coil 5 and 5' and provided with the vacuum/pressure inlets 4 and 4'.

The upper part of the perforating press 6 is equipped with the needle points 7 while the lower part 6' contains corresponding holes 7' to receive the needles when the press is closed.

In operation of the invention a length L of plastic tubing is drawn from the feed roll 1 through the first processing step by rotation of the take-up roll 9. The top half of the mold is then lowered onto the bottom half. This seals off the tubing by means of the lip 16 and the cup 17 which extend around the periphery of the mold halves which are shown in cross section in FIGS. 1 and 2. Vacuum is then applied through the ports 4 and 4' by opening valve 8. The tubing now expands to fill the mold as shown in FIG. 2. Contact of the thermoplastic material with the heated inside surfaces of the mold forms the garment. At the same time that the mold is closing, the upper part of the perforating press is lowered. The needles 7 which are arranged to fit around the periphery of the garment and along each seam pass through the tubing into the holes 7' in the lower part of the press. This produces small holes in the garment along those lines where tearing will later be needed.

In a third step for each garment, the mold and perforating press are opened and the freshly formed garment in the mold released by application of a positive pressure through valve 8. The tubing is next advanced by turning the take-up roll 9. The perforated garment is on its way to storage on the take up roll, the freshly formed garment is in place in the perforating press and a new section of tubing is aligned in the mold.

Figure 3:
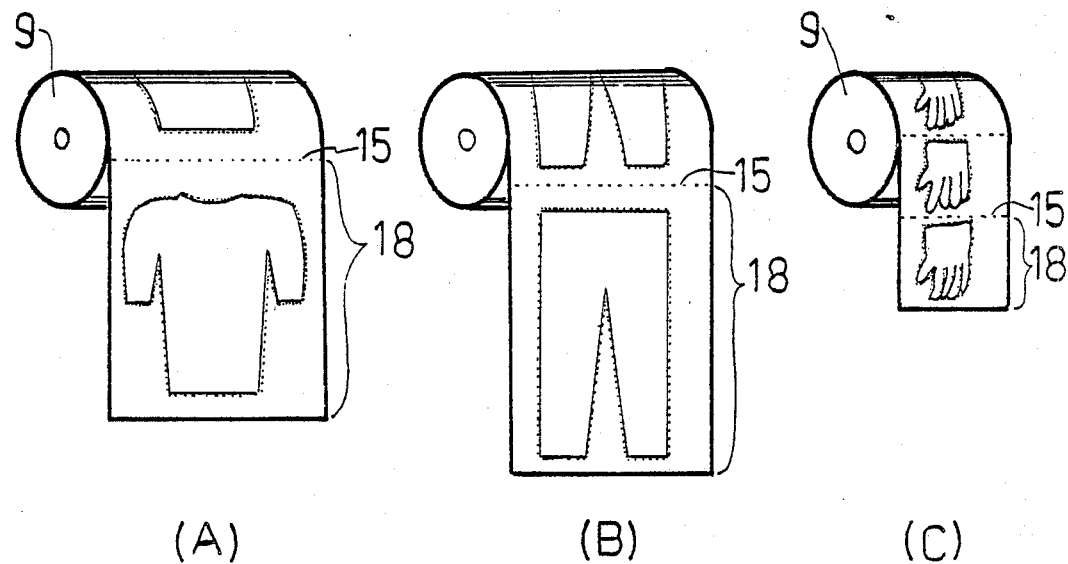
FIG. 3 illustrates rolls of finished garments as they are stored prior to use.

Some finished take-up rolls are shown in FIG. 3. An individual, wishing to separate a garment for use, unrolls the length 18, tears it off at 15 and then opens it along the other perforations.

Dimensions of the mold are varied to achieve a variety of garment sizes.

Unlike the garments of the prior art, the units produced by the present invention have a high degree of conformity to the body of the wearer and a high degree of coverage.

In a second embodiment of the present invention a series of ultrasonic heads are imbedded along the periphery of the mold and are used to seal the plastic tubing along the seams required for the garment. The heat of the mold and vacuum are used to form the garment as before. Pockets lapels and other additions can be attached by manual, ultrasonic stitching prior to the final roll up.

Although flat tubing is a preferred form of the thermosplastic material of the garments, it is possible to employ two rolls of single sheeting which are superimposed prior to feeding into the mold.

The plastic material can be chosen from a number of commercially available substances such as spun-bonded polyethylene fiber(e.g. Tyvek), polyurethane, polypropylene, polystyrene, polyvinyl chloride and plastic-cloth combinations (e.g. Naugaform).

Although a specific illustration of the invention has been described, other embodiments and arrangements can be employed without departing from the teachings of the present invention. With some plastics, for example, the separation of the formed garment from the mold will require temporary cooling of the mold's inner surfaces as well as positive air pressure. It is also possible to store the finished garments in flat form by folding along the lines 15 of FIG. 3 in a manner similar to that now used for computer-printed sheets.

I claim:
1. A process for producing clothing comprised of:
   a. feeding a section of flattened thermoplastic tubing into a heated, two piece mold which is internally shaped in the form of the desired article of clothing so that a portion of the tubing is trapped and sealed off from the ambient air, drawing a vacuum between the walls of the mold and the tubing so that the tubing expands to conform to the internally shaped form of the mold and is permanently shaped into the desired article;
   b. relieving the vacuum, applying positive air pressure between the walls of the mold and the now-formed tubing so as to free it from the mold and opening the mold;
   c. drawing the sheet of tubing containing the formed article of clothing into a perforating press made up of a flat, moveable head containing needles arranged in a suitable pattern and a flat stationary bed containing holes corresponding to the position of said needles;
2. A process for producing clothing as described in claim 1 to which pockets and lapels may be added by ultrasonic welding.

* * * * *